United States Patent Office 3,433,785
Patented Mar. 18, 1969

3,433,785
15,16-DISUBSTITUTED AROMATIC STEROIDS, INTERMEDIATES AND PROCESSES
Andrew John Manson and Donald K. Phillips, North Greenbush, N.Y., assignors to Sterling Drug Inc., New York, N.Y., a corporation of Delaware
No Drawing. Filed July 11, 1966, Ser. No. 564,025
U.S. Cl. 260—239.5         25 Claims
Int. Cl. C07c 173/10, 169/00, 167/00

ABSTRACT OF THE DISCLOSURE

3 - lower - alkoxy - 1,3,5(10),15 - estratetraen - 17-ones are reduced or reacted with R'-lithium to give the corresponding 17α-R'-17β-OH compounds, where R' is hydrogen, lower-alkyl, lower-alkenyl, lower-alkynyl, hydroxy-lower-alkynyl or halo-lower-alkynyl. Various reagents are added to the 15,16-double bond to give 15,16-dioxy compounds, 15,16-epoxy compounds, [16,15-c]-1'-pyrazolines, and 15,16-methylene compounds. The products possess antihypercholesteremic activity.

This invention relates to new aromatic steroids, and in particular is concerned with ring A or ring A and B aromatic steroids substituted in the 15-, 16- and 17-position, and bearing in the 3-position a hydroxy group or etherified or esterified hydroxy group. The invention is also concerned with 15,16-unsaturated intermediates in the preparation of the foregoing compounds, and with methods for preparation of the intermediates and final products.

The final products of the invention comprise those having the structural formula:

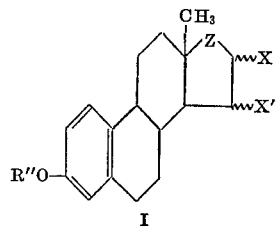

I wherein R″ is hydrogen, lower-alkyl, or carboxylic acyl having from one to twelve carbon atoms; Z is C=O, C(R')(OR—β) or

wherein R is hydrogen or carboxylic acyl having from one to twelve carbon atoms, R' is hydrogen, lower-alkyl, lower-alkenyl, lower-alkynyl, hydroxy-lower-alkynyl or halo-lower-alkynyl, and Y is lower-alkylene of 2–3 carbon atoms; X and X' are OH or O-Acyl, Acyl being carboxylic acyl having from one to twelve carbon atoms, or X and X' together represent —O—, —OC(lower-alkyl)₂O—, —CH₂— or —CH(lower-alkyl)—; or a compound of the above formula having two additional double bonds in the 6,7- and 8,9-positions.

When R″ in the above Formula I stands for lower-alkyl, the lower-alkyl groups can have from one to six carbon atoms, thus including such groups as methyl, ethyl, propyl, isopropyl, butyl, hexyl, and the like.

When R' in the grouping C(R')(OR-β) defining Z in the above Formula I stands for a hydrocarbon or substituted hydrocarbon group, the hydrocarbon moiety can have up to six carbon atoms. Thus R can represent such groups as methyl, ethyl, propyl, isopropyl, hexyl, vinyl, allyl, 2-butenyl, methallyl, ethylnyl, 1-propynyl, 1-butynyl, 3-hydroxy-1-propynyl, 3-chloro-1-propynyl, chloroethynyl, 3-bromo-1-propynyl, and the like.

The term carboxylic acyl as used throughout stands for carboxylic acyl having from one to twelve carbon atoms, preferably having a molecular weight less than about 250. Representative of the lower-carboxylic acyl radicals which can be present are lower-alkanoyl, e.g., acetyl, propionyl, isobutyryl, caproyl, heptanoyl, octanoyl, dodecanoyl, trimethylacetyl, and the like; cycloalkyl-lower-alkanoyl wherein cycloalkyl has 5–6 ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; carbamyl, including unsubstituted carbamyl, N-lower-alkylcarbamyl and N,N-di-lower-alkylcarbamyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups can preferably have from one to four carbon atoms.

The compounds of Formula I are prepared by oxidation or addition reactions involving the 15,16-double bond of compounds having the formula

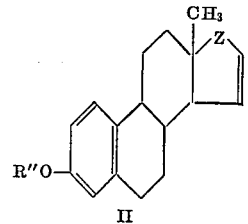

II wherein R″ and Z have the meanings given hereinabove.

The compounds of Formula I where X and X' are OH are prepared by reacting a compound of Formula II with an oxidizing agent capable of converting an olefinic double bond to a glycol. Such oxidizing agents include osmium tetroxide and potassium permanganate. The glycol compounds of Formula I where X and X' are OH can then be acylated to give compounds where X and X' are O-acyl, or reacted with a lower-aliphatic ketone under acid conditions to give a ketonide of Formula I where X and X' together represent —OC(lower-alkyl)₂O—, lower-alkyl preferably having from one to six carbon atoms.

The compounds of Formula I where X and X' together represent —O— are prepared by reacting a compound of Formula II with an oxidizing agent capable of converting an olefinic double bond to an epoxide. Such agents include hydrogen peroxide under alkaline conditions, or a carboxylic peracid, for example, perbenzoic acid, monoperphthalic acid, peracetic acid, and the like.

The foregoing reactions are preferably carried out starting with compounds of Formula II where Z is C=O

or C(R')(OR—β) where R' is hydrogen or lower-alkyl. The compounds of Formula I where Z is C(R')(OR—β), R being H and R' being lower-alkenyl, lower-alkynyl, hydroxy-lower-alkynyl or halo-lower-alkynyl, can best be prepared by reacting a compound of Formula I where Z is C=O with the appropriate organometallic compound containing the radical R', e.g., R'-lithium. The compounds where R is carboxylic acyl are prepared by conventional esterification reactions.

The compounds of Formula I where X and X' together represent —CH$_2$— or —CH(lower-alkyl)— are prepared as follows: A compound of Formula II where R'' is lower-alkyl and Z is C=O is reacted with a diazo-lower-alkane, and the resulting steroido[16,15-c]pyrazoline of the formula

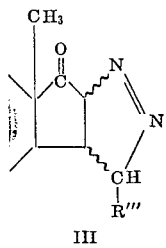

wherein R''' is hydrogen or lower-alkyl is heated either alone or in acid medium to give a compound of the formula

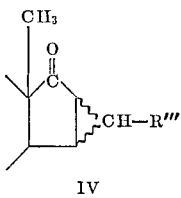

When R''' stands for lower-alkyl, it preferably has from one to four carbon atoms; thus the diazo-lower-alkane reactant preferably has from one to five carbon atoms. The 17-carbonyl group in Formulas III or IV can be ketalized, reduced to hydroxy, or caused to react with the appropriate organometallic compound containing the radical R', e.g., R'-lithium to produce compounds of the formulas:

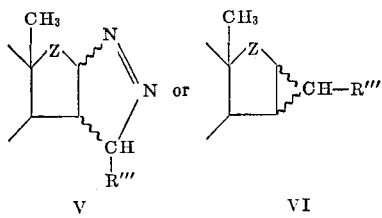

wherein Z is

or C(R')(OR-β), Y and R' having the meanings given above and R being H. Compounds where R is carboxylic acyl are prepared by conventional esterification reactions.

The compounds of Formula V can be heated either alone or in acid medium to give the corresponding compounds of Formula VI.

The invention contemplates compounds of Formula I in both the 15α,16α-configuration and 15β,16β-configuration, although in most instances the 15β,16β-epimer is the predominant product of the oxidation or addition reaction and the one most readily isolated.

A further aspect of the invention resides in compounds of the formula

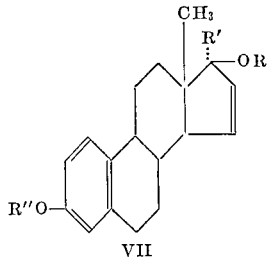

wherein R is hydrogen or carboxylic acyl having from one to twelve carbon atoms, R' is hydrogen, lower-alkyl, lower-alkenyl, lower-alkynyl, hydroxy-lower-alkynyl or halo-lower-alkynyl, and R'' is hydrogen, lower-alkyl or carboxylic acyl having from one to twelve carbon atoms; or a compound of the above formula having two additional double bonds in the 6,7- and the 8,9-positions. These compounds are not only useful as intermediates in preparing compounds of Formula I, but also have useful physiological properties as indicated below.

The compounds of Formula VII are prepared starting from a 3-lower-alkoxy-1,3,5(10),15-estratetraen-17-one. The latter can be reduced with a metal hydride to give a compound of Formula VII where R and R' are hydrogen; or reacted with an organometallic compound containing the radical R', e.g., R'-lithium, to give a compound of Formula VII wherein R' is lower-alkyl, lower-alkenyl, lower-alkynyl, hydroxy-lower-alkynyl or halo-lower-alkynyl. The compounds wherein R is carboxylic acyl are prepared by conventional esterification reactions.

A further aspect of the invention resides in the compounds 3 - lower - alkoxy - 16 - benzoyloxy - 1,3,5(10),15-estratetraen-17-one and 3-lower-alkoxy-1,3,5(10),14-estratetraene-16β,17β-diol acetone cyclic acetal, prepared as described below in Examples 16 and 24, respectively. The lower-alkoxy groups can have from one to six carbon atoms.

The structures of the compounds of the invention were established by the modes of synthesis, by elementary analysis and by ultraviolet, infrared and NMR spectra.

Endocrinological evaluation of the compounds of the invention has shown that they possess the property of lowering the concentration of cholesterol in the blood serum of rats and altering the blood lipid levels and ratios in cockerels, thus indicating their usefulness in preventing and alleviating atherosclerotic conditions. The compounds of the invention also possess estrogenic properties, but of a low enough level of activity so that unwanted side-effects resulting from the estrogenicity are usually not observed at antihypercholesteremically effective dose levels. The compounds are effective in doses of 0.5–25 mg./kg. and can be prepared for use in the manner employed for other physiologically active steroidal substances.

The following examples will further illustrate the invention without the latter being limited thereby.

EXAMPLE 1

(a) 17β-acetoxy-3-methoxy-1,3,5(10),15-estratetraene [VII; R is COCH$_3$, R' is H, R'' is CH$_3$]

To a stirred solution of 5.00 g. of 3-methoxy-1,3,5(10), 15-estratetraen - 17 - one (15 - dehydroestrone methyl ether) in 50 ml. of tetrahydrofuran and 100 ml. of anhydrous ether cooled in ice was added 2.50 g. of lithium aluminum hydride. The reaction mixture was stirred one hour at 0° C. and allowed to stand at room temperature for 40 hours. The mixture was cooled in ice, ethyl acetate added to destroy excess lithium aluminum hydride and saturated sodium sulfate solution added until the salts had coagulated. Solid anhydrous sodium sulfate was added, and after 15 minutes the ether layer was decanted, the solid washed with ether, and the combined organic solutions washed with saturated sodium chloride solution, filtered through anhydrous sodium sulfate and concentrated in vacuo. The residue was dissolved in 25 ml. of pyridine, 15 ml. of acetic anhydride added, and the mixture kept at room temperature for 65 hours, poured into ice-water and extracted with ether-benzene (1:1). The extracts were washed with saturated sodium chloride solution, filtered through anhydrous sodium sulfate and concentrated in vacuo. The residue was dissolved in a small volume of benzene and chromatographed on 200 g. of silica gel prewet with pentane. The column was eluted with pentane and pentane containing increasing amounts of ether. Eluants containing 8% ether brought out the desired product, 4.62 g., which was repeatedly recrystallized from a benzene-methanol mixture to give 17β-acetoxy-3-methoxy-1,3,5(10),15-estratetraene, colorless prisms, M.P. 138.6–141.0° C. (corr.); $[\alpha]_D^{25} = -35.0°$ (1% in chloroform).

By replacing the acetic anhydride in the foregoing preparation by a molar equivalent amount of caproyl chloride, β-cyclohexylpropionyl chloride, p-nitrobenzoyl chloride, β-phenylpropionyl chloride, cinnamoyl chloride, p-chlorophenoxy-acetyl chloride or nicotinoyl chloride there can be obtained, respectively, 17β-caproyloxy-3-methoxy - 1,3,5(10),15 - estratetraene, 17β - (β - cyclohexylpropionyloxy) - 3 - methoxy - 1,3,5(10),15 - estratetraene, 17β - (p - nitrobenzoyloxy) - 3 - methoxy - 1,3,5(10),15 - estratetraene, 17β - (β - phenylpropionyloxy)- 3-methoxy-1,3,5(10),15 - estratetraene, 17β - cinnamoyloxy - 3 - methoxy - 1,3,5(10),15 - estratetraene, 17β - (p-chlorophenoxyacetoxy) - 3 - methoxy - 1,3,5(10),15-estratetraene or 17β-nicotinoyloxy-3-methoxy-1,3,5(10),15-estratetraene.

(b) 3-methoxy-1,3,5(10),15-estratetraen-17β-ol [VII; R and R' are H, R" is CH₃]

A solution of 2 g. of potassium hydroxide in 20 ml. of water was added to a solution of 4.00 g. of 17β-acetoxy-3-methoxy-1,3,5(10),15-estratetraene in 150 ml. of methanol, and the mixture was stirred for 18 hours at room temperature. The reaction mixture was poured into cold water and stirred, and the solid product was collected by filtration, washed with water and recrystallized twice from a benzene-methanol mixture to give 3-methoxy-1,3,5(10),15-estratetraen-17β-ol, colorless rods, M.P. 152.6–157.2° C. (corr.); $[\alpha]_D^{25} = +1.5°$ (1% in chloroform).

By replacing the 3-methoxy-1,3,5(10),15-estratetraen-17-one in the foregoing preparation by a molar equivalent amount of 3-methoxy-1,3,5(10),6,8,15-estrahexaen-17-one or 1,3,5(10),15-estratetraene-3-ol-17-one there can be obtained, respectively, 3-methoxy-1,3,5(10),6,8,15-estrahexaen-17β-ol or 1,3,5(10),15-estratetraene-3,17β-diol [VII; R, R' and R" are H]. The 1,3,5(10),15-estratetraene-3,17β-diol can be acetylated with acetic anhydride to give 3,17β-diacetoxy-1,3,5(10),15-estratetraene [VII; R is COCH₃, R' is H, R" is CH₃CO].

EXAMPLE 2

3-methoxy-17α-methyl-1,3,5(10),15-estratetraen-17β-ol [VII; R is H, R' and R" are CH₃]

A solution of 2.50 g. of 3-methoxy-1,3,5(10),15-estratetraen-17-one (15-dehydroestrone methyl ether) in 50 ml. of tetrahydrofuran (distilled from calcium hydride) was added over a period of 10 minutes to 50 ml. of methyllithium in ether (1.26–1.64 millimoles per ml.) with stirring. The reaction mixture was stirred for 10 minutes, water added, and the mixture extracted with an ether-benzene mixture. The extracts were washed with water and saturated sodium chloride, filtered through anhydrous sodium sulfate and concentrated in vacuo. The residue was recrystallized twice from methanol to give 3-methoxy-17α-methyl-1,3,5(10),15 - estratetraen - 17β - ol, colorless flakes, M.P. 108.6–109.6° C. (corr.); $[\alpha]_D^{25} = -65.3°$ (1% in chloroform).

By replacing the methyllithium in the foregoing preparation by a molar equivalent amount of butyllithium, vinyllithium or propynylmagnesium bromide there can be obtained, respectively, 3-methoxy-17α-butyl-1,3,5(10),-15-estratetraen-17β-ol [VII; R is H, R' is C₄H₉, R" is CH₃], 3-methoxy-17α - vinyl - 1,3,5(10),15 - estratetraen-17β-ol [VII; R is H, R' is CH=CH₂, R" is CH₃], or 3-methoxy-17α-(1-propynyl)-1,3,5(10),15-estratetraen-17β-ol [VII; R is H, R' is C≡CCH₃, R" is CH₃].

By replacing the 3-methoxy-1,3,5(10),15-estratetraen-17-one in the foregoing preparation by a molar equivalent amount of 3-methoxy-1,3,5(10),6,8,15-estrahexaen-17-one there can be obtained 3-methoxy-17α-methyl-1,3,5(10),-6,8,15-estrahexaen-17β-ol.

EXAMPLE 3

3-methoxy-17α-ethynyl-1,3,5(10),15-estratetraen-17β-ol [VII; R is H, R' is C≡CH, R" is CH₃]

A solution of 100 ml. of 1.59 M butyllithium in hexane and 100 ml. of tetrahydrofuran was added over a fifteen minute period with stirring to 400 ml. of tetrahydrofuran saturated with acetylene. The mixture was stirred while acetylene was passed through for forty-five minutes, then cooled in ice and a solution of 10.00 g. of 3-methoxy-1,3,5(10),15-estratetraen-17-one in 300 ml. of tetrahydrofuran added dropwise over a period of twenty minutes. The reaction mixture was stirred in an ice bath for thirty minutes, and then saturated sodium sulfate solution was added dropwise until the salts coagulated. The liquid supernatant was decanted and the solid material washed three times with ether-benzene (1:1). The combined organic solutions were washed with saturated sodium chloride solution, filtered through anhydrous sodium sulfate and concentrated in vacuo. The residue was recrystallized repeatedly from a benzene-methanol mixture to give 3-methoxy-17α-ethynyl-1,3,5(10),15 - estratetraen - 17β - ol, colorless flakes, M.P. 150–151.6° C. (corr.); $[\alpha]_D^{25} = -194.0°$ (1% in chloroform).

EXAMPLE 4

3-methoxy-17α-(3 - hydroxy - 1 - propynl) - 1,3,5(10),15-estratetraen-17β-ol [VII; R is H, R' is C≡CCH₂OH, R" is CH₃]

A solution of 2.3 g. of 2-(2'-propynyloxy)tetrahydropyran in 30 ml. of ether was added with stirring over a period of ten minutes to a solution of methyllithium in ether (9.0 ml., 1.68 millimoles/ml.) in 10 ml. of ether while cooling in ice under a nitrogen atmosphere. The mixture was then stirred at room temperature for fifteen minutes, cooled in ice, and 3.00 g. of 3-methoxy-1,3,5-(10),15-estratetraen-17-one in 40 ml. of tetrahydrofuran was added with stirring under a nitrogen atmosphere over a period of ten minutes. The reaction mixture was stirred at room temperature for twenty-five minutes, then cooled in ice and water added. The mixture was extracted with ether-benzene, and the extracts were washed with water and saturated sodium chloride solution, filtered through anhydrous sodium sulfate and concentrated in vacuo. To the residue was added 100 mg. of p-toluenesulfonic acid and 50 ml. of absolute ethanol, and the mixture was stirred at reflux under nitrogen for twenty-five minutes. The reaction mixture was poured into water, extracted with ethyl acetate, and the extracts washed with water and saturated sodium chloride solution, filtered through anhydrous sodium sulfate and concentrated in vacuo. The residue was recrystallized three times from an ethyl acetate-methanol mixture to give 3-methoxy-17α-(3-hydroxy-1-propynyl)-1,3,5(10),15-estratetraen-17β-ol, pale yellow crystals, M.P. 215.5–220.0° C. (corr.); $[\alpha]_D^{25} = -248.7°$ (1% in pyridine).

EXAMPLE 5

3-methoxy-17α-chloroethynyl-1,3,5(10),15-estratetraen-17β-ol [VII; R is H, R' is C≡CCl, R'' is CH₃]

To a solution of methyllithium in ether (37 ml., 1.68 millimoles/ml.) in a nitrogen atmosphere at 0° C. was added a solution of 8 ml. of cis-1,2-dichloroethylene in 35 ml. of ether. The mixture was stirred at room temperature under nitrogen, then cooled in ice and a solution of 3.00 g. of 3-methoxy-1,3,5(10),15-estratetraen-17-one in 45 ml. of tetrahydrofuran was added. The reaction mixture was stirred at 0° for five minutes, water added and the mixture extracted with ether. The ether extracts were washed with saturated sodium chloride solution, filtered through anhydrous sodium sulfate and concentrated in vacuo. The residue was recrystallized from a benzene-methanol mixture to give 2.13 g. of 3-methoxy-17α-chloroethynyl-1,3,5(10),15-estratetraen-17β-ol, pale tan crystals, M.P. 158.0–160.8° C. (corr.); $[\alpha]_D^{25} = -254.1°$ (1% in chloroform).

EXAMPLE 6

3-methoxy-15β,16β-dihydroxy-1,3,5(10)-estratrien-17-one [I; R'' is CH₃, X and X' are OH, Z is C=O]

A mixture of 10.00 g. of 3-methoxy-1,3,5(10),15-estratetraen-17-one, 10.00 g. of osmium tetroxide, 5 drops of pyridine and 400 ml. of dioxane was kept at room temperature in the dark for 24 hours. The reaction mixture was cooled, saturated with hydrogen sulfide gas, filtered and concentrated in vacuo. The residue, 8.49 g., M.P. 135–145° C. was recrystallized repeatedly from a methanol-ethyl acetate mixture to give 3-methoxy-15β,16β-dihydroxy-1,3,5(10)-estratrien-17-one, colorless rods, M.P. 216.5–217.5° C. (dec.) (corr.); $[\alpha]_D^{25} = +180.8°$ (0.5% in pyridine).

By replacing the 3-methoxy-1,3,5(10),15-estratetraen-17-one in the foregoing preparation by a molar equivalent amount of 3 - methoxy - 1,3,5(10),6,8,15 - estrahexaen-17-one or 1,3,5(10),15 - estratetraen - 3 - ol - 17 - one there can be obtained, respectively, 3-methoxy-15β,16β-dihydroxy - 1,3,5(10),6,8 - estrapentaen - 17 - one or 3,15β,16β - trihydroxy - 1,3,5(10) - estratrien - 17 - one [I; R'' is H, X and X' are OH, Z is C=O].

3 - methoxy - 15β,16β - dihydroxy - 1,3,5(10) - estratrien-17-one was treated with an excess of acetic anhydride in pyridine solution at 0° for 24 hours. The product was isolated by adding the mixture to water and collecting the product by filtration. There was thus obtained 3 - methoxy - 15β,16β - diacetoxy - 1,3,5(10)-estratrien-17-one [I; R'' is CH₃, X and X' are OCOCH₃, Z is C=O], M.P. 188–190° C. (uncorr.).

3,15β,16β - trihydroxy - 1,3,5(10)-estratrien - 17 - one can similarly be acetylated to give 3,15β,16β-triacetoxy-1,3,5(10)-estratrien-17-one [I; R'' is CH₃CO, X and X' are OCOCH₃, Z is C=O].

EXAMPLE 7

3 - methoxy - 15β,16β,17β - triacetoxy - 1,3,5(10)-estratriene [I; R'' is CH₃, X and X' are OCOCH₃, Z is CH(OCOCH₃-β)]

A solution of 2.66 g. of 3-methoxy-15β,16β-dihydroxy-1,3,5(10)-estratrien-17-one (Example 6) in 175 ml. of tetrahydrofuran was added to a stirred suspension of 500 mg. of lithium aluminum hydride in 25 ml. of ether cooled in ice. The mixture was stirred for 15 minutes, 0.5 g. of lithium aluminum hydride added and the mixture stirred 15 minutes longer. Ethyl acetate and saturated sodium sulfate solution were added to the mixture until the gray color turned white. The reaction mixture was acidified with dilute hydrochloric acid, diluted with water and extracted with an ether-benzene mixture. The combined extracts were washed with dilute sodium chloride solution and saturated sodium chloride solution, filtered through anhydrous sodium sulfate and concentrated in vacuo. The residue, consists of 3-methoxy - 1,3,5(10) - estratriene - 15β,16β,17β - triol was dissolved in 25 ml. of pyridine, 15 ml. of acetic anhydride added and the mixture kept at room temperature for 4 days. The product was isolated and recrystallized from a benzene-hexane mixture to give 3-methoxy-15β,16β,17β-triacetoxy - 1,3,5(10) - estratriene, colorless rods, M.P. 166.2–167.8° C. (corr.); $[\alpha]_D^{25} = +18.5°$ (1% in chloroform).

EXAMPLE 8

3 - methoxy - 15β,16β - dihydroxy - 17 - ethylenedioxy-1,3,5(10)-estratriene [I; R'' is CH₃, X and X' are OH, Z is C(OCH₂)₂] was prepared from 4.80 g. of 3-methoxy-17 - ethylenedioxy - 1,3,5(10),15 - estratetraene, 4.00 g. of osmium tetroxide, 25 ml. of pyridine and 25 ml. of dioxane according to the procedure described above in Example 6. The crude product was dissolved in benzene and chromatographed on 250 g. of Florisil (activated magnesium silicate) prewet with benzene. The column was eluted with the solvent series benzene-ether-ethyl acetate. The desired product was brought out by ether and ether containing 5% ethyl acetate and recrystallized from a chloroform-hexane mixture to give 3-methoxy-15β,16β-dihydroxy - 17 - ethylenedioxy - 1,3,5(10) - estratriene, cream-colored flat rods, M.P. 136.0–137.8° C. (corr.); $[\alpha]_D^{25} = +64.8°$ (0.5% in pyridine).

EXAMPLE 9

3 - methoxy - 15β,16β - diacetoxy - 17 - ethylenedioxy-1,3,5(10)-estratriene [I; R'' is CH₃, X and X' are OCOCH₃, Z is C(OCH₂)₂]

A mixture of 3.00 g. of 3-methoxy-15β,16β-dihydroxy-17 - ethylenedioxy - 1,3,5(10) - estratriene, 5 ml. of acetic anhydride and 10 ml. of pyridine was kept at room temperature for 16 hours. the product was isolated and recrystallized three times from a benzene-methanol mixture to give 3 - methoxy - 15β,16β-diacetoxy - 17 - ethylenedioxy - 1,3,5(10) - estratriene, M.P. 130.5–132.0° C. (corr.); $[\alpha]_D^{25} = -27.2°$ (1% in chloroform).

EXAMPLE 10

3 - methoxy - 15β,16β-dibenzoyloxy - 17 - ethylenedioxy-1,3,5(10) - estratriene [I; R'' is CH₃, X and X' are OCOC₆H₅, Z is C(OCH₂)₂]

To an ice cold solution of 2.00 g. of 3-methoxy-15β,16β-dihydroxy - 17 - ethylenedioxy - 1,3,5(10) - estratriene in 6 ml. of pyridine was added 3.0 ml. of benzoyl chloride. The reaction mixture was kept at room temperature for five and one-half days, then poured into 100 ml. of cold potassium bicarbonate solution, stirred and extracted with an ether-benzene mixture. The extracts were washed with saturated sodium chloride solution, filtered through anhydrous sodium sulfate and concentrated in vacuo. The residue was dissolved in benzene and chromatographed on 150 g. of Florisil prewet with pentane. The column was eluted with pentane containing increasing amounts of ether. Eluants containing 7.5–15% ether brought out the desired product, 3 - methoxy - 15β,16β - dibenzoyloxy-17-ethylenedioxy-1,3,5(10), estratriene as an amber glass; $[\alpha]_D^{25} = -34.2°$ (1% in chloroform).

By replacing the benzoyl chloride in the foregoing preparation by a molar equivalent amount of caproyl chloride, β-cyclohexylpropionyl chloride, p-nitrobenzoyl chloride, β-phenylpropionyl chloride, cinnamoyl chloride, p-chlorophenoxyacetyl chloride or nicotinoyl chloride there can be obtained, respectively, 3-methoxy-15β,16β-dicaproyloxy-17-ethylenedioxy-1,3,5(10)-estratriene, 3-methoxy-15β,16β-di-(β-cyclohexylpropionyloxy)-17-ethylenedioxy-1,3,5(10)-estratriene, 3-methoxy-15β,16β-di-(p-nitrobenzoyloxy)-17-ethylenedioxy-1,3,5(10)-estratriene, 3-methoxy-15β,16β-di-(β-phenylpropionyloxy)-17-ethylenedioxy-1,3,5(10)-estratriene, 3-methoxy-15β,16β-dicinnamoyloxy-17-ethylenedioxy-1,3,5(10)-estratriene, 3-methoxy-15β,16β-di-(p-chlorophenoxyacetoxy)-17-ethylenedioxy-1,3,5(10)estratriene or 3-methoxy-15β,16β-dinicotinoyloxy-17-ethylenedioxy-1,3,5(10)-estratriene.

EXAMPLE 11

3 - methoxy - 15β,16β - dihydroxy - 1,3,5(10) - estratrien - 17 - one acetone cyclic acetal [I; R″ is CH$_3$, X and X′ are —OC(CH$_3$)$_2$O—, Z is C=O]

A mixture of 4.73 g. of 3-methoxy-15β,16β-dihydroxy-1,3,5(10)-estratrien-17-one, 150 mg. of p-toluenesulfonic acid and 250 ml. of acetone was stirred at room temperature for 16 hours. The reaction mixture was concentrated in vacuo to a volume of 50 ml., poured into 200 ml. of aqueous potassium bicarbonate and extracted with ether-benzene (1:1). The extracts were washed with saturated sodium chloride solution, filtered through anhydrous sodium sulfate and concentrated in vacuo. The residue was dissolved in benzene and chromatographed on 100 g. of Florisil prewet with pentane. The column was eluted with pentane containing increasing amounts of ether. Eluants containing 2–30% ether brought out the desired product which was recrystallized three times from ethanol to give 3 - methoxy - 15β,16β - dihydroxy - 1,3,5(10)-estratrien-17-one acetone cyclic acetal, fine colorless rods, M.P. 105.0–108.0° C. (corr.); $[\alpha]_D^{25}$=+163.1° (1% in chloroform). A polymorphic form having the M.P. 151–152° C. (uncorr.) was also obtained.

3-methoxy - 15β,16β - dihydroxy - 1,3,5(10),6,8-estrapentaen-17-one can similarly be converted to 3-methoxy-15β,16β-dihydroxy - 1,3,5(10),6,8-estrapentaen - 17-one acetone cyclic acetal.

EXAMPLE 12

3-methoxy - 17α-methyl - 1,3,5(10)-estratriene-15β,16β,17β-triol cyclic acetone 15,16-acetal [I; R″ is CH$_3$, X and X′ are —OC(CH$_3$)$_2$O—, Z is C(CH$_3$) (OH—β)]

To an ice cold methyllithium solution (50 ml. of 1.68 molar in ether) in a nitrogen atmosphere was added over a period of 15 minutes a solution of 6.51 g. of 3-methoxy-15β,16β-dihydroxy - 1,3,5(10)-estratrien-17-one acetone cyclic acetal in 25 ml. of tetrahydrofuran and 15 ml. of ether. The reaction mixture was stirred for 30 minutes, added to water and extracted with ether. The ether extracts were washed with saturated sodium chloride solution, filtered through anhydrous sodium sulfate and concentrated in vacuo. The residue was recrystallized twice from a benzene-methanol mixture to give 3-methoxy-17α-methyl-1,3,5(10)-estratriene-15β,16β,17β-triol cyclic acetone 15,16-acetal, M.P. 136.0–138.0° C. (corr.); $[\alpha]_D^{25}$=+18.9° (1% in chloroform).

By replacing the methyllithium in the foregoing preparation by a molar equivalent amount of butyllithium, vinyllithium or propynylmagnesium bromide there can be obtained, respectively, 3-methoxy-17α-butyl - 1,3,5(10)-estratriene-15β,16β,17β-triol cyclic acetone 15,16-acetal [I; R″ is CH$_3$, X and X′ are —OC(CH$_3$)$_2$O—, Z is C(C$_4$H$_9$) (OH—β)], 3-methoxy - 17α-vinyl - 1,3,5(10)-estratriene-15β,16β,17β-triol cyclic acetone 15,16-acetal [I; R″ is CH$_3$, X and X′ are —OC(CH$_3$)$_2$O—, Z is C(CH=CH$_2$) (OH—β)], or 3-methoxy-17α-(1-propynyl)-1,3,5(10)-estratriene-15β,16β,17β-triol cyclic acetone 15,16-acetal [I; R″ is CH$_3$, X and X′ are

—OC(CH$_3$)$_2$O—

Z is C(C≡CCH$_3$) (OH—β)].

Similarly 3-methoxy-15β,16β-dihydroxy - 1,3,5(10),6,8-estrapentaen-17-one acetone cyclic acetal can be caused to react with methyllithium to give 3-methoxy-17α-methyl-1,3,5(10),6,8-estrapentaene - 15β,16β,17β-triol cyclic acetone 15,16-acetal.

EXAMPLE 13

3-methoxy-17α-methyl - 1,3,5(10)-estratriene - 15,16,17β-triol [I; R″ is CH$_3$, X and X′ are OH, Z is C(CH$_3$) (OH—β)]

(a) From 3-methoxy-17α-methyl - 1,3,5(10),15-estratetraen-17β-ol.—To a solution of 5.30 g. of 3-methoxy-17α-methyl - 1,3,5(10),15-estratetraen-17β-ol in 25 ml. of dioxane containing 5 drops of pyridine was added a solution of 5.00 g. of osmium tetroxide in 55 ml. of dioxane. The reaction mixture was kept at room temperature in the dark for 20 hours and worked up according to the procedure described in Example 2. The crude product was dissolved in a small amount of chloroform and chromatographed on 180 g. of silica gel prewet with pentane. The column was eluted with pentane containing increasing amounts of ether. Eluants containing 40–60% of ether brought out one product which was recrystallized from acetonitrile and from a benzene-acetonitrile mixture to give 3-methoxy-17α-methyl - 1,3,5(10)-estratriene-15α,16α,17β-triol. Later fractions of the chromatogram (70% either in pentane to 5% methanol in ether) brought out a second product which was recrystallized from a benzene-acetonitrile mixture to give 3-methoxy-17α-methyl-1,3,5(10)-estratriene-15β,16β,17β-triol, colorless flakes, M.P. 165.4–167.2° C. (corr.); $[\alpha]_D^{25}$=+64.4° (1% in pyridine).

(b) From 3-methoxy - 17α-methyl - 1,3,5(10)-estratriene - 15β,16β,17β-triol cyclic acetone 15,16-acetal.—A solution of 300 mg. of 3-methoxy - 17α-methyl-1,3,5(10)-estratriene - 15β,16β,17β-triol cyclic acetone 15,16-acetal (Example 12) and a few crystals of p-toluenesulfonic acid in 10 ml. of methanol and 1 ml. of water was stirred and refluxed under nitrogen for six days. An additional few crystals of p-toluenesulfonic acid and 5 ml. of methanol were added at the beginning of the second, third and fifth days. The reaction mixture was poured into cold water containing potassium bicarbonate. The solid product was collected, washed with water and recrystallized from aqueous acetonitrile to give 200 mg. of 3-methoxy-17α-methyl - 1,3,5(10)-estratriene - 15β,16β,17β-triol, M.P. 162.5–163.5° C. (uncorr.). Further recrystallization gave a sample with M.P. 165.0–166.8° C. (corr.), $[\alpha]_D^{25}$=+62.4° (1% in pyridine).

By replacing the 3-methoxy-17α-methyl - 1,3,5(10)-estratriene -15β,16β,17β-triol cyclic acetone 15,16-acetal in the foregoing preparation by a molar equivalent amount of 3-methoxy - 17α-butyl-1,3,5(10)-estratriene - 15β,16β,17β-triol cyclic acetone 15,16-acetal, 3-methoxy - 17α-vinyl - 1,3,5(10)-estratriene-15β,16β,17β-triol cyclic acetone 15,16-acetal, 3-methoxy-17α-(1-propynyl)-1,3,5(10)-estratriene-15β,16β,17β-triol cyclic acetone 15,16-acetal or 3-methoxy - 17α-methyl - 1,3,5(10),6,8 - estrapentaene-15β,16β,17β-triol cyclic acetone 15,16-acetal there can be obtained, respectively, 3-methoxy - 17α-butyl - 1,3,5(10)-estratriene - 15β,16β,17β-triol [I; R″ is CH$_3$, X and X′ are OH, Z is C(C$_4$H$_9$) (OH—β)], 3-methoxy-17α-vinyl-1,3,5(10)-estratriene - 15β,16β,17β-triol [I; R″ is CH$_3$, X and X′ are OH, Z is C(CH=CH$_2$) (OH—β)], 3-methoxy - 17α-(1-propynyl) - 1,3,5(10)-estratriene - 15β,16β,17β-triol [I; R″ is CH$_3$, X and X′ are OH, Z is C(C≡CCH$_3$) (OH—β)], or 3-methoxy - 17α-methyl-1,3,5(10),6,8-estrapentaene - 15β,16β,17β-triol.

EXAMPLE 14

3-methoxy - 17α-ethynyl - 1,3,5(10)-estratriene-15β,16β-17β-triol acetone cyclic 15,16-acetal [I; R″ is CH$_3$, X and X′ are —OC(CH$_3$)$_2$O—, Z is C(C≡CH) (OH—β)]

To a solution of 4.89 g. of 3-methoxy - 15β,16β-dihydroxy - 1,3,5(10)-estratrien-17-one acetone cyclic acetal (Example 11) and one drop of pyridine in 100 ml. of dimethylsulfoxide in a nitrogen atmosphere was added 5.08 g. of lithium acetylide-ethylene diamine complex. The reaction mixture was stirred at room temperature under nitrogen for 30 minutes, then poured into one liter of ice water and extracted with an ether-ethyl acetate mixture. The extracts were washed with saturated sodium chloride solution, filtered through anhydrous sodium sulfate and concentrated in vacuo. The residue was recrystallized repeatedly from a benzene-ether mixture to give 3-methoxy - 17α-ethynyl - 1,3,5(10)-estratriene-15β, 16β17β-triol acetone cyclic 15,16-acetal, M.P. 171.0–172.0° C. (corr.); $[\alpha]_D^{25}$=—17.0° (1% in chloroform).

3-methoxy - 17α-ethynyl - 1,3,5(10)-estratriene - 15β, 16β,17β-triol acetone cyclic 15,16-acetal can be treated with p-toluene-sulfonic acid according to the procedure described above in Example 13, part (b) to give 3-methoxy-17α-ethynyl - 1,3,5(10)-estratriene - 15β,16β,17β-triol [I; R" is CH₃, X and X' are OH, Z is C(C≡CH) (OH—β)].

By the procedure described above in Example 4, 3-methoxy - 15β,16β-dihydroxy - 1,3,5(10)-estratrien - 17-one acetone cyclic acetal (Example 11) can be caused to react with 2-(2'-propynyloxy)tetrahydropyran and methyllithium, and the product heated with p-toluenesulfonic acid in ethanol, to give 3-methoxy-17α-(3-hydroxy-1-propynyl) -1,3,5(10)-estratriene - 15β,16β,17β-triol [I; R" is CH₃, X and X' are OH, Z is C(C≡CCH₂OH) (OH—β)].

By the procedure described above in Example 5, 3-methoxy-15β,16β-dihydroxy - 1,3,5(10)-estratrien-17-one acetone cyclic acetal can be caused to react with cis-1,2-dichloroethylene and methyllithium to give 3-methoxy-17α-chloroethynyl - 1,3,5(10)-estratriene - 15β,16β,17β-triol acetone cyclic 5,16-acetal [I; R" is CH₃, X and X' are —OC(CH₃)₂O—, Z is C(C≡CCl) (OH—β)], which can be cleaved with p-toluenesulfonic acid to give 3-methoxy-17α-chloroethynyl - 1,3,5(10)-estratriene - 15β,16β, 17β-triol [I; R" is CH₃, X and X' are OH, Z is C(C≡CCl) (OH—β)].

EXAMPLE 15

3-methoxy-15β,16β-dihydroxy-1,3,5(10)-estratrien-17-one 16-monobenzoate [I; R" is CH₃, X is OCOC₆H₅, X' is OH, Z is C=O]

Benzoic anhydride (4.0 g.) was added to a solution of 2.0 g. of 3-methoxy-15β,16β-dihydroxy-1,3,5(10)-estratrien-17-one (Example 6) in 100 ml. of pyridine. The reaction mixture was allowed to stand for 24 hours, then stirred for 20 hours and poured into 700 ml. of water. After one hour the solid product was collected, washed with water, dried at 60° C. and recrystallized successively from acetone, methylene dichloride-ether and acetone-ether to give 3-methoxy-15β,16β-dihydroxy-1,3,5(10)-estratrien-17-one 16-monobenzoate, colorless needles, M.P. 185.4–186.6° C. (corr.); $[\alpha]_D^{25}$=+141.3° (1% in chloroform).

Reduction of 3-methoxy-15β,16β-dihydroxy-1,3,5(10)-estratrien-17-one 16-monobenzoate with calcium in liquid ammonia afforded the known 15β,17β-dihydroxy-3-methoxy-1,3,5(10)-estratriene, thus proving the assignment of the β-configuration to the 15- and 16-hydroxy groups.

EXAMPLE 16

3-methoxy-16-benzoyloxy-1,3,5(10),15-estratetraen-17-one

Benzoyl chloride (10.0 ml.) was added to a solution of 5.27 g. of 3-methoxy-1,3,5(10)-estratriene-15β,16β-diol-17-one 16-monobenzoate (Example 15) in 30 ml. of pyridine and the mixture was stored in the dark for one week, then poured into water and extracted with methylene dichloride. The extracts were washed with water and saturated sodium chloride solution, dried over anhydrous sodium sulfate and concentrated in vacuo. The residue was chromatographed on 350 g. of Florisil and the column was eluted with pentane-ether (9:1). The product was recrystallized several times from acetone to give 3-methoxy-16-benzoyloxy - 1,3,5(10),15 - estratetraen-17-one, colorless elongated rods, M.P. 208.0–210.0° C. (corr.); $[\alpha]_D^{25}$=—16.8° (1% in chloroform).

EXAMPLE 17

3-methoxy-15β,16β-epoxy-1,3,5(10)-estratrien-17-one [I; R" is CH₃, X and X' are —O—, Z is C=O]

A solution of 3.00 g. of 3-methoxy-1,3,5(10),15-estratetraen-17-one in 200 ml. of tetrahydrofuran (freshly distilled from calcium hydride and lithium aluminum hydride) was stirred at —15 to —10° C., and 18 ml. of 30% hydrogen peroxide was added dropwise. There was then added 6 ml. of 10% aqueous sodium hydroxide, and the reaction mixture was stirred at —15 to —10° C. for 1 hour, at —10 to —5° C. for 2 hours, then allowed to warm to 7–8° C. over a period of 16 hours and stirred at this temperature for 57 hours. Ether and water were added to the mixture, the layers separated and the aqueous layer extracted with ether. The combined organic solutions were washed with sodium chloride solution, filtered through anhydrous sodium sulfate and concentrated in vacuo. The residue was recrystallized from benzene-methanol to give 3-methoxy-15β,16β-epoxy-1,3,5(10)-estratrien-17-one, colorless rods, M.P. 189.4–190.8° C. (corr.); $[\alpha]_D^{25}$=—12.9° (1% in chloroform).

By replacing the 3-methoxy-1,3,5(10),15-estratetraen-17-one in the foregoing preparation by a molar equivalent amount of 3-methoxy-1,3,5(10),6,8,15-estrahexaen-17-one or 1,3,5(10),15-estratetraen-3-ol-17-one there can be obtained, respectively, 3-methoxy-15β,16β-epoxy-1,3,5(10), 6,8-estrapentaen-17-one or 15β,16β-epoxy-1,3,5(10)-estratrien-3-ol-17-one [I; R" is H, X and X' are —O—, Z is C=O].

EXAMPLE 18

3-methoxy-15β,16β-epoxy-1,3,5(10)-estratrien-17β-ol [I; R" is CH₃, X and X' are —O—, Z is CH(OH-β)]

A mixture of 2.05 g. of 3-methoxy-15β,16β-epoxy-1,3,5 (10)-estratrien-17-one (Example 17) and 400 mg. of sodium borohydride in 150 ml. of isopropyl alcohol was stirred for one hour at 15–20° C., then concentrated to a small volume in vacuo and diluted with chloroform and water. The aqueous layer was extracted with chloroform and the combined chloroform solutions were washed with water and saturated sodium chloride solution, filtered through anhydrous sodium sulfate and concentrated in vacuo. The residue was recrystallized from a benzene-hexane mixture to give 3-methoxy-15β,16β-epoxy-1,3,5(10)-estratrien-17β-ol, fine colorless rods, M.P. 147.0–151.2° C.; $[\alpha]_D^{25}$=+59.5° (1% in chloroform).

EXAMPLE 19

3 - methoxy-15β,16β-epoxy - 17β - acetoxy - 1,3,5(10)-estratriene [I; R" is CH₃, X and X' are —O—, Z is CH(OCOCH₃-β)] was prepared from 3.00 g. of 3-methoxy-15β,16β-epoxy-1,3,5(10)-estratrien - 17β-ol (Example 18) and 5 ml. of acetic anhydride in 15 ml. of pyridine, kept 16 hours at 0° C. The product was isolated and recrystallized from a benzene-methanol mixture to give 3 - methoxy - 15β,16β - epoxy - 17β - acetoxy - 1,3, 5(10) - estratriene, M.P. 179.0–182.0° C. (corr.); $[\alpha]_D^{25}$=+23.1° (1% in chloform).

EXAMPLE 20

3 - methoxy - 15β,16β - epoxy - 17β - benzoyloxy-1,3,5(10)-estratriene [I; R" is CH₃, X and X' are —O—, Z is CH(OCOC₆H₅-β)] was prepared from 3.00 g. of 3-methoxy - 15β,16β-epoxy - 1,3,5(10)-estratrien - 17β - ol (Example 18) and 1.5 ml. of benzoyl chloride in 15 ml. of pyridine, kept at 0° C. for about 16 hours. The product was isolated and recrystallized from a benzene-methanol mixture to give 3-methoxy-15β,16β-epoxy-17β-benzoyloxy- 1,3,5(10)-estratriene, M.P. 172.0–173.0° C. (corr.); [α]$_D^{25}$=+73.5° (1% in chloroform).

EXAMPLE 21

3 - methoxy - 15β,16β - epoxy - 17β - dichloroacetoxy-1,3,5(10)-estratriene [I; R'' is CH$_3$, X and X' are —O—, Z is CH(OCOCHCl$_2$-β)] was prepared from 3.00 g. of 3 - methoxy - 15β,16β - epoxy - 1,3,5(10) - estratrien-17β-ol (Example 18) and 1.5 ml. of dichloroacetic anhydride in 15 ml. of pyridine, kept at 0° for about 16 hours. The product was recrystallized from a benzene-methanol mixture to give 3-methoxy-15β,16β-epoxy-17β-dichloroacetoxy-1,3,5(10)-estratriene, fine colorless rods, M.P. 150.0–151.0° C. (corr.); [α]$_D^{25}$=+24.8° (1% in chloroform).

EXAMPLE 22

3 - methoxy - 15β,16β - epoxy - 17β - (β-phenyl-propionoxy)-1,3,5(10)-estratriene [I; R'' is CH$_3$, X and X' are —O—, Z is CH(OCOCH$_2$CH$_2$C$_6$H$_5$-β)] was prepared from 3.00 g. of 3-methoxy-15β,16β-epoxy-1,3,5(10)-estratrien-17β-ol (Example 18) and about 3 g. of β-phenyl-propionyl chloride in 15 ml. of pyridine, kept at 0° for 2 days. The product was isolated, chromatographed on silica gel and eluted with pentane-ether to give 3-methoxy-15β,16β - epoxy - 17β-(β-phenylpropionoxy) - 1,3,5(10)-estratriene, fine colorless rods, M.P. 142.4–144.2° C. (corr.); [α]$_D^{25}$=+38.0° (1% in chloroform).

EXAMPLE 23

3 - methoxy - 15β,16β - epoxy - 1,3,5(10) - estratrien - 17β-ol methylcarbamate [I; R'' is CH$_3$, X and X' are —O—, Z is CH(OCONHCH$_3$-β)]

Methyl isocyanate (5 ml.) was added to an ice cold solution of 3.00 g. of 3-methoxy-15β,16β-epoxy-1,3,5(10)-estratrien-17β-ol (Example 18) in 25 ml. of tetrahydrofuran. The mixture was kept at 0° for 18 hours, then 5 ml. of methyl isocyanate was added and the mixture kept at 0° for 2 days. Finally 5 ml. of methyl isocyanate was added, and after 4 days the mixture was added to 300 ml. of cold water containing ammonium hydroxide. The solid product was collected, washed with water, dried, and recrystallized twice from a benzene-methanol mixture to give 3-methoxy-15β,16β-epoxy-1,3,5(10)-estratrien-17β-ol methylcarbamate, M.P. 232.5–235.5° C. (corr.); [α]$_D^{25}$=+71.1° (1% in pyridine).

EXAMPLE 24

3-methoxy-1,3,5(10),14-estratetraene-16β,17β-diol acetone cyclic acetal

A mixture of 9.00 g. of 3-methoxy-15β,16β-epoxy-1,3,5(10)-estratrien-17β-ol (Example 18) and about 5 ml. of 7% aqueous perchloric acid in 150 ml. of acetone was kept at room temperature for 7 hours. The reaction mixture was then poured into 800 ml. of cold aqueous potassium bicarbonate and extracted with ethyl acetate. The extracts were washed with saturated aqueous sodium chloride, filtered through anhydrous sodium sulfate and concentrated in vacuo. The residue was dissolved in benzene and chromatographed on 250 g. of Florisil prewet with pentane. The column was eluted with pentane containing increasing amounts of ether. Eluants containing 2–5% of ether brought out the product which was recrystallized from a benzene-methanol mixture to give 3-methoxy-1,3,5(10),14-estratetraene-16β,17β-diol acetone cyclic acetal, colorless rods, M.P. 119.8–121.2° C. (corr.); [α]$_D^{25}$=+238.0° (1% in chloroform).

EXAMPLE 25

3 - methoxy - 15β,16β - epoxy - 17α - methyl - 1,3,5(10)-estratrien-17β-ol [I; R'' is CH$_3$, X and X' are —O—, Z is C(CH$_3$)(OH-β)] was prepared from 2.00 g. of 3-methoxy - 15β,16β - epoxy - 1,3,5(10) - estratrien - 17 - one (Example 17) and 40 ml. of methyllithium in ether (1.26–1.64 millimoles/ml.) according to the procedure described above in Example 12. The product was recrystallized twice from a benzene-methanol mixture to give 3-methoxy-15β,16β-epoxy-17α-methyl-1,3,5(10)-estratrien-17β-ol, M.P. 152.6–154.0° C. (corr.); [α]$_D^{25}$=+18.2° (1% in chloroform).

By replacing the methyllithium in the foregoing preparation by a molar equivalent amount of butyllithium, vinyllithium or propynylmagnesium bromide, there can be obtained, respectively, 3-methoxy-15β,16β-epoxy-17α-butyl-1,3,5(10)estratrien-17β-ol [I; R'' is CH$_3$, X and X' are —O—, Z is C(C$_4$H$_9$)(OH-β)], 3-methoxy-15β,16β-epoxy-17α-vinyl-1,3,5(10)-estratrien-17β-ol [I; R'' is CH$_3$, X and X' are —O—, Z is C(CH=CH$_2$)(OH-β)], or 3-methoxy - 15β,16β - epoxy - 17α - (1 - propynyl) - 1,3,5(10)-estratrien-17β-ol [I; R'' is CH$_3$, X and X' are —O—, Z is C(C≡CCH$_3$)(OH-β)].

Similarly, 3-methoxy-15β,16β-epoxy-1,3,5(10),6,8-estrapentaen-17-one can be caused to react with methyllithium to give 3-methoxy-15β,16β-epoxy-17α-methyl-1,3,5(10),6,8-estrapentaen-17β-ol.

EXAMPLE 26

3 - methoxy - 15β,16β - epoxy - 17α - (3 - hydroxy - 1 - propynyl)-1,3,5(10)-estratrien-17β-ol [I; R'' is CH$_3$, X and X' are —O—, Z is C(C≡CCH$_2$OH)(OH-β)] was prepared from 5.00 g. of 3-methoxy-15β,16β-epoxy-1,3,5(10)-estratrien-17-one (Example 17), 20 ml. of methyllithium in ether (1.68 millimoles/ml.) and 5.25 g. of 2-(2'-propynyloxy)tetrahydropyran according to the procedure described above in Example 4. The hydrolyzed product was chromatographed on 250 g. of Florisil and eluted with pentane-ether. The resulting material was recrystallized from acetonitrile to give 3-methoxy-15β,16β-epoxy - 17α - (3 - hydroxy - 1 - propynyl) - 1,3,5(10) - estratrien-17β-ol, M.P. 170.0–171.6° C. (corr.); [α]$_D^{25}$=—71.6° (1% in pyridine).

EXAMPLE 27

3 - methoxy - 15β,16β - epoxy - 17α - chloroethynyl - 1,3,5(10)-estratrien-17β-ol [I; R'' is CH$_3$, X and X' are —O—, Z is C(C≡CCl)(OH-β)] was prepared from 5.00 g. of 3-methoxy-15β,16β-epoxy-1,3,5(10)-estratrien-17-one (Example 17), 75 ml. of methyllithium in ether (1.68 millimoles/ml.) and 15 ml. of cis-1,2-dichloroethylene according to the procedure described above in Example 5. The product was recrystallized from acetonitrile and from benzene to give 3-methoxy-15β,16β-epoxy-17α-chloroethynyl-1,3,5(10)-estratrien-17β-ol, pale yellow crystals, M.P. 148.0–149.8° C. (corr.); [α]$_D^{25}$=—86.6° (1% in chloroform).

EXAMPLE 28

3-methoxy-1,3,5(10)-estratrieno[16,15-c]-1'-pyrazolin-17-one [III; R''' is H]

To a solution of 12.0 g. of 3-methoxy-1,3,5(10),15-estratetraen-17-one in 200 ml. of chloroform was added 2.8 g. of diazomethane in 100 ml. of ether (prepared by the decantation method from methyl-N-nitrosourea), and the mixture was kept at room temperature for 20 hours. The precipitate which had formed was collected, washed with ether and recrystallized from benzene to give 3-methoxy - 1,3,5(10) - estratrieno[16,15-c] - 1' - pyrazolin-17-one, colorless prisms, M.P. 223.0–224.8° C. (dec.) (corr.); [α]$_D^{25}$=+604.1° (1% in chloroform).

By replacing the 3-methoxy-1,3,5(10),15-estratetraen-17-one in the foregoing preparation by a molar equivalent amount of 3-methoxy-1,3,5(10),6,8,15-estrahexaen-17-one there can be obtained 3-methoxy-1,3,5(10),6,8-estrapentaeno[16,15-c]-1'-pyrazolin-17-one.

By replacing the diazomethane in the foregoing preparation by a molar equivalent amount of diazoethane or diazopentane there can be obtained, respectively, 3-methoxy - 1,3,5(10) - estratrieno[16,15-c] - 3' - methyl - 1' - pyrazolin-17-one [III; R''' is CH$_3$] or 3-methoxy-1,3,5(10) - estratrieno[16,15-c] - 3' - butyl - 1' - pyrazolin - 17-one [III; R''' is C$_4$H$_9$].

3-methoxy-1,3,5(10)-estratrieno[16,15-c]-1'-pyrazolin-17-one can be reduced with sodium borohydride to give 3-methoxy-1,3,5(10)-estratrieno[16,15-c]-1'-pyrazolin-17β-ol [V; R''' is H, Z is CH(OH-β)].

According to procedures described hereinabove, 3-methoxy-1,3,5(10)-estratrieno[16,15-c]-1'-pyrazolin-17-one can be caused to react with methyllithium, butyllithium, ethynyllithium, vinyllithium, 2-(2'-propynyloxy)tetrahydropyran and methyllithium, or cis-1,2-dichloroethylene and methyllithium to give, respectively, 3-methoxy-17α-methyl-1,3,5(10)-estratrieno-[16,15-c]-1'-pyrazolin-17β-ol [V; R''' is H, Z is C(CH₃)(OH-β)], 3-methoxy-17α-butyl-1,3,5(10)-estratrieno[16,15-c]-1'-pyrazolin-17β-ol [V; R''' is H, Z is C(C₄H₉)(OH-β)], 3-methoxy-17α-ethynyl-1,3,5(10)-estratrieno[16,15-c]-1'-pyrazolin-17β-ol [V; R''' is H, Z is C(C≡CH)(OH-β)], 3-methoxy-17α-vinyl-1,3,5(10)-estratrieno-[16,15-c]-1'-pyrazolin-17β-ol [V; R''' is H, Z is C(CH=CH₂)(OH-β)], 3-methoxy-17α-(3-hydroxy-1-propynyl)-1,3,5(10)-estratrieno-[16,15-c]-1'-pyrazolin-17β-ol [V; R''' is H, Z is C(C≡CCH₂OH)(OH-β)], or 3-methoxy-17α-chloroethynyl-1,3,5(10)-estratrieno[16,15-c]-1'-pyrazolin-17β-ol [V; R''' is H, Z is C(C≡CCl)(OH-β)].

Example 29

3-methoxy-15,16-methylene-1,3,5(10)-estratrien-17-one
[I; R'' is CH₃, X and X' are —CH₂—, Z is C=O]

A solution of 6.77 g. of 3-methoxy-1,3,5(10)-estratrieno[16,15-c]-1'-pyrazolin-17-one (Example 28) in 80 ml. of 80% aqueous acetic acid was heated on a steam bath with frequent stirring for 1 hour. The reaction mixture was cooled, diluted with water until turbidity resulted and allowed to stand at room temperature for 16 hours. The solid product was collected by filtration, the filtrate extracted twice with methylene dichloride, and the extracts were washed with saturated sodium chloride solution and concentrated in vacuo. The residue and original solid product were combined and chromatographed on 400 g. of silica gel. The column was eluted with pentane-ether (9:1) and the product recrystallized from acetone to give 3-methoxy-15,16-methylene-1,3,5(10)-estratrien-17-one, colorless prisms, M.P. 175.8–176.5° C. (corr.); $[\alpha]_D^{25} = +15.5°$ (1% in chloroform).

By a similar procedure 3-methoxy-1,3,5(10),6,8-estrapentaeno[16,15-c]-1'-pyrazolin-17-one can be converted to 3-methoxy-15,16-methylene-1,3,5(10),6,8-estrapentaen-17-one.

According to procedures described hereinabove, 3-methoxy-15,16-methylene-1,3,5(10)-estratrien-17-one can be caused to react with methyllithium, butyllithium, ethynyllithium, vinyllithium, 2-(2'-propynyloxy)tetrahydropyran and methyllithium, or cis-1,2-dichloroethylene and methyllithium to give, respectively, 3-methoxy-15,16-methylene-17α-methyl-1,3,5(10)-estratrien-17β-ol [I; R'' is CH₃, X and X' are —CH₂—, Z is C(CH₃)(OH-β)], 3-methoxy-15,16-methylene-17α-butyl-1,3,5(10)-estratrien-17β-ol [I; R'' is CH₃, X and X' are —CH₂—, Z is C(C₄H₉)(OH-β)], 3-methoxy-15,16-methylene-17α-ethynyl-1,3,5(10)-estratrien-17β-ol [I; R'' is CH₃, X and X' are —CH₂—, Z is C(C≡CH)(OH-β)], 3-methoxy-15,16-methylene-17α-vinyl-1,3,5(10)-estratrien-17β-ol [I; R'' is CH₃, X and X' are —CH₂—, Z is C(CH=CH₂)(OH-β)], 3-methoxy-15,16-methylene-17α-(3-hydroxy-1-propynyl)-1,3,5(10)-estratrien-17β-ol [I; R'' is CH₃, X and X' are —CH₂—, Z is C(C≡CCH₂OH)(OH-β)], or 3-methoxy-15,16-methylene-17α-chloroethynyl-1,3,5(10)-estratrien-17β-ol [I; R''₂ is CH₃, X and X' are —CH₂—, Z is C(C≡CCl)(OH-β)]. The same products can alternatively be prepared by heating the corresponding estratrienol [16,15-c]-1'-pyrazolin-17β-ols in aqueous acetic acid.

3-methoxy-15,16-methylene-1,3,5(10)-estratrien-17-one can be reduced with sodium borohydride according to the procedure of Example 18 to give 3-methoxy-15,16-methylene-1,3,5(10)-estratrien-17β-ol [I; R'' is CH₃, X and X' are —CH₂—, Z is CH(OH-β)].

The latter can be esterified with acetic anhydride, benzoyl chloride, β-phenylpropionyl chloride and the like to give respectively, the 17-acetate, 17-benzoate, 17-(β-phenylpropionate), and the like.

3-methoxy-15,16-methylmethylene-1,3,5(10)-estratrien-17-one [I; R'' is CH₃, X and X' are —CH(CH₃)—, Z is C=O] or 3-methoxy-15,16-butylmethylene-1,3,5(10)-estratrien-17-one [I; R'' is CH₃, X and X' are —CH(CH₄H₉)—, Z is C=O] can be prepared by heating in aqueous acetic acid 3-methoxy-1,3,5(10)-estratrieno[16,15-c]-3'-methyl-1'-pyrazolin-17-one or 3-methoxy-1,3,5(10)-estratrieno[16,15-c]-3-butyl-1''-pyrazolin-17-one.

We claim:
1. A compound of the formula

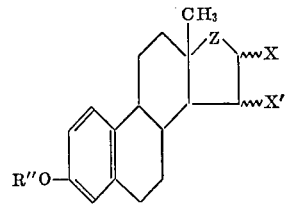

wherein R'' is hydrogen, lower-alkyl, or carboxylic acyl having from one to twelve carbon atoms; Z is C=O, C(R')(OR-β) or

wherein R is hydrogen or carboxylic acyl having from one to twelve carbon atoms, R' is hydrogen, lower-alkyl, lower-alkenyl, lower-alkynyl, hydroxy-lower-alkynyl or halo-lower-alkynyl, and Y is lower-alkylene of 2-3 carbon atoms; X and X' are OH or O-acyl, acyl being carboxylic acyl having from one to twelve carbon atoms, or X and X' together represent —O—, —OC(lower-alkyl)₂O—, —CH₂—, or —CH(lower-alkyl)—; or a compound of the above formula having two additional double bonds in the 6,7- and the 8,9-positions.

2. A compound according to claim 1 wherein R'' is methyl and X and X' are β-OH or β-O-acyl.

3. 3-methoxy-15β,16β,17β-triacetoxy-1,3,5(10)-estratriene, according to claim 2, wherein X and X' are acetoxy and Z is CH(OCOCH₃-β).

4. 3-methoxy-17α-methyl-1,3,5(10)-estratriene-15,16,17β-triol, according to claim 2, wherein X and X' are OH and Z is C(CH₃)(OH-β).

5. 3-methoxy-15β,16β-dihydroxy-1,3,5(10)-estratrien-17-one 16-monobenzoate, according to claim 2, wherein X is benzoyloxy, X' is OH and Z is C=O.

6. A compound according to claim 1 wherein R'' is methyl and X and X' together represent —O—.

7. 3-methoxy-15β,16β-epoxy-1,3,5(10)-estratrien-17-one, according to claim 6, wherein Z is C=O.

8. 3-methoxy-15β,16β-epoxy-1,3,5(10)-estratrien-17β-ol, according to claim 6, wherein Z is CH(OH-β).

9. 3-methoxy-15β,16β-epoxy-17α-methyl-1,3,5(10)-estratrien-17β-ol, according to claim 6, wherein Z is C(CH₃)(OH-β).

10. 3-methoxy-15β,16β-epoxy-17α-chloroethynyl-1,3,5(10)-estratrien-17β-ol, according to claim 6, wherein Z is C(C≡CCl)(OH-β).

11. A compound of the formula

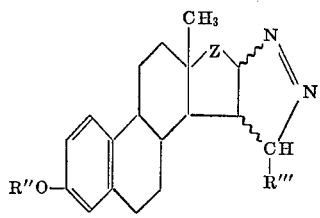

wherein R" is lower-alkyl, R''' is hydrogen or lower-alkyl, and Z is C=O, C(R')(OR—β) or

wherein R is hydrogen or carboxylic acyl having from one to twelve carbon atoms, R' is hydrogen, lower-alkyl, lower-alkenyl, lower-alkynyl, hydroxy-lower-alkynyl or halo-lower-alkynyl, and Y is lower-alkylene of 2–3 carbon atoms; or a compound of the above formula having two additional double bonds in the 6,7- and 8,9-positions.

12. 3 - methoxy - 1,3,5(10)-estratrieno[16,15-c]-1'-pyrazolin-17-one, according to claim 11, wherein R" is CH₃, R''' is hydrogen and Z is C=O.

13. A compound according to claim 1 wherein R" is methyl and X and X' together represent —CH₂—.

14. 3 - methoxy - 15,16-methylene-1,3,5(10)-estratrien-17-one, according to claim 13, wherein Z is C=O.

15. A compound of the formula

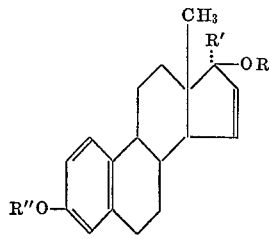

wherein R is hydrogen or carboxylic acyl having from one to twelve carbon atoms, R' is hydrogen, lower-alkyl, lower-alkenyl, lower-alkynyl, hydroxy-lower-alkynyl or halo-lower-alkynyl, and R" is hydrogen, lower-alkyl or carboxylic acyl having from one to twelve carbon atoms; or a compound of the above formula having two additional double bonds in the 6,7- and 8,9-positions.

16. 3 - methoxy - 17α - methyl-1,3,5(10),15-estratetraen-17β-ol, according to claim 15, wherein R is H and R' and R" are CH₃.

17. 3 - methoxy - 17α - chloroethynyl - 1,3,5(10),15-estratetraen-17β-ol, according to claim 15, wherein R is H, R' is C≡CCl and R" is CH₃.

18. 3 - lower - alkoxy - 16 - benzoyloxy-1,3,5(10),15-estratetraen-17-one.

19. 3 - methoxy - 16 - benzoyloxy - 1,3,5(10)-15-estratetraen-17-one, according to claim 18, wherein lower-alkoxy is methoxy.

20. 3 - lower - alkoxy - 1,3,5(10),14-estratetraene-16β-17β-diol acetone cyclic acetal.

21. 3 - methoxy - 1,3,5(10),14 - estratetraene - 16β,17β-diol acetone cyclic acetal, according to claim 20, wherein lower-alkoxy is methoxy.

22. A process for preparing a compound according to claim 1 wherein R' is hydrogen or lower-alkyl and X and X' are both OH, which comprises reacting a compound according to claim 15, wherein R' is hydrogen or lower-alkyl, with an oxidizing agent capable of converting an olefinic double bond to a glycol.

23. A process for preparing a compound according to claim 1 wherein R' is hydrogen or lower-alkyl and X and X' together represent —O—, which comprises reacting a compound according to claim 15, wherein R' is hydrogen or lower-alkyl, with an oxidizing agent capable of converting an olefinic double bond to an epoxide.

24. A process for preparing a compound according to claim 1 wherein X and X' together represent —CH₂— or —CH(lower-alkyl)—, which comprises heating either alone or in acid medium a compound according to claim 11.

25. A process for preparing a compound according to claim 11 wherein R" is lower-alkyl and Z is C=O which comprises reacting a 3-lower-alkoxy-1,3,5(10),15-estratetraen-17-one with a diazo-lower-alkane.

References Cited

UNITED STATES PATENTS 3,198,792   8/1965   Reerink et al. _____ 260—239.55

ELBERT L. ROBERTS, *Primary Examiner.*

U.S. Cl. X.R.

167—74; 260—239.55, 397.4, 397.5, 999

PO-1050
(5/69)

UNITED STATES PATENT OFFICE
CERTIFICATE OF CORRECTION

Patent No. 3,433,785  Dated March 18, 1969

Inventor(s) Andrew John Manson and Donald K. Phillips

It is certified that error appears in the above-identified patent and that said Letters Patent are hereby corrected as shown below:

Column 2, line 9, "ethylnyl," should read --ethynyl, --.
Column 6, line 50, "-propynl)-" should read -- -propynyl)- --.
Column 8, line 5, "consists" should read --consisting--.
Column 10, line 25, "either" should read --ether--.
Column 11, line 34, "5,16-" should read --15,16- --.
Column 15, line 70, " $R"_2$ " should read --R"--; line 72, "estratrienol" should read --estratrieno--.

SIGNED AND
SEALED
AUG 1 3 1970

(SEAL)
Attest:

Edward M. Fletcher, Jr.
Attesting Officer

WILLIAM E. SCHUYLER, JR.
Commissioner of Patents